United States Patent
Suriye et al.

(10) Patent No.: US 10,336,947 B2
(45) Date of Patent: Jul. 2, 2019

(54) PROCESS FOR CONVERSION OF A HYDROCARBON FEED

(71) Applicant: SMH Co., Ltd, Bangkok (TH)

(72) Inventors: Kongkiat Suriye, Samutprakan (TH); Amnart Jantharasuk, Nakhon Si Thammarat (TH); Wuttithep Jareewatchara, Bangkok (TH)

(73) Assignee: SMH Co., Ltd, Bangkok (TH)

( * ) Notice: Subject to any disclaimer, the term of this patent is extended or adjusted under 35 U.S.C. 154(b) by 0 days.

(21) Appl. No.: 15/737,762

(22) PCT Filed: Jun. 29, 2016

(86) PCT No.: PCT/EP2016/065085
§ 371 (c)(1),
(2) Date: Dec. 19, 2017

(87) PCT Pub. No.: WO2017/001446
PCT Pub. Date: Jan. 5, 2017

(65) Prior Publication Data
US 2018/0112137 A1    Apr. 26, 2018

(30) Foreign Application Priority Data
Jun. 29, 2015 (EP) .................................. 15174324

(51) Int. Cl.
| | |
|---|---|
| *C01G 45/00* | (2006.01) |
| *B01J 23/652* | (2006.01) |
| *B01J 23/62* | (2006.01) |
| *C10G 11/04* | (2006.01) |
| *C10G 45/00* | (2006.01) |
| *B01J 29/076* | (2006.01) |

(52) U.S. Cl.
CPC ............. *C10G 11/04* (2013.01); *B01J 23/626* (2013.01); *B01J 23/6527* (2013.01); *B01J 29/076* (2013.01); *C10G 45/00* (2013.01); *B01J 2523/00* (2013.01); *B01J 2523/13* (2013.01); *B01J 2523/22* (2013.01); *B01J 2523/36* (2013.01); *B01J 2523/43* (2013.01); *B01J 2523/48* (2013.01); *B01J 2523/69* (2013.01); *B01J 2523/828* (2013.01)

(58) Field of Classification Search
CPC ........ C10G 11/04; C10G 45/00; B01J 29/076; B01J 23/626; B01J 23/6527; B01J 2523/13; B01J 2523/22; B01J 2523/36; B01J 2523/69; B01J 2523/48; B01J 2523/43; B01J 2523/00; B01J 2523/828
See application file for complete search history.

(56) References Cited

U.S. PATENT DOCUMENTS

| | | | |
|---|---|---|---|
| 3,649,566 A | 3/1972 | Hayes et al. | |
| 3,830,727 A | 8/1974 | Kluksdahl et al. | |
| 3,932,548 A | 1/1976 | Rausch | |
| 4,786,625 A | 11/1988 | Imai et al. | |
| 6,130,183 A * | 10/2000 | Herskowitz | B01J 23/007 502/224 |
| 6,872,300 B1 | 3/2005 | Galperin et al. | |
| 8,198,498 B2 | 6/2012 | Keyvanloo et al. | |
| 8,933,286 B2 | 1/2015 | Souza et al. | |
| 2012/0091038 A1 | 4/2012 | Lacombe et al. | |
| 2014/0249339 A1* | 9/2014 | Simanzhenkov | B01J 19/0046 585/252 |

FOREIGN PATENT DOCUMENTS

| | | |
|---|---|---|
| CN | 104107712 A | 10/2014 |
| EP | 2441516 A1 | 4/2012 |
| WO | 2006/046952 A1 | 5/2006 |

OTHER PUBLICATIONS

Apr. 20, 2011, Lihui Wan et al., "Influence of Lanthanum Addition on Catalytic Properties of PtSnk/Al2O3 Catalyst for Isobutae Dehydrogenation"—Industrial & Engineering Chemistry Research, vol. 50, No. 8, pp. 4280-4285.
Sep. 9, 2016—International Search Report—PCT/EP2016/065085.

* cited by examiner

*Primary Examiner* — Randy Boyer
*Assistant Examiner* — Juan C Valencia
(74) *Attorney, Agent, or Firm* — Banner & Witcoff, Ltd.

(57) ABSTRACT

The present invention relates to a process for conversion of a hydrocarbon feed comprising saturated hydrocarbon compounds to olefin products comprising contacting a hydrocarbon feed stream with a catalyst in an oxidic form of the formula M1M2M3M4O comprising metals M1, M2, M3 and M4, wherein: M1 is selected from Si, Al, Zr, and mixtures thereof; M2 is selected from Pt, Cr, and mixtures thereof; M3 is selected from W, Mo, Re, and mixtures thereof; and M4 is selected from Sn, K, Y, Yb and mixtures thereof; wherein: mass fraction of M1 is in the range of 0.1 to 0.8; mass fraction of M2 is in the range of 0.001 to 0.2; mass fraction of M3 is in the range of 0.001 to 0.2; mass fraction of M4 is in the range of 0.0001 to 0.2; and mass fraction of oxygen is in the range of 0.1 to 0.8.

17 Claims, No Drawings

PROCESS FOR CONVERSION OF A HYDROCARBON FEED

CROSS-REFERENCE TO RELATED APPLICATIONS

This application is a U.S. National Stage application under 35 U.S.C. § 371 of International Application PCT/EP2016/065085 (published as WO 2017/001446 A1), filed Jun. 29, 2016 which claims the benefit of priority to Application EP 15174324.2, filed Jun. 29, 2015. Benefit of the filing date of each of these prior applications is hereby claimed. Each of these prior applications is hereby incorporated by reference in its entirety.

FIELD OF INVENTION

The present invention relates to a process for conversion of a hydrocarbon feed comprising saturated hydrocarbon compounds to olefin products.

BACKGROUND OF INVENTION

Olefins, especially light olefins including ethylene and propylene, are valuable hydrocarbon products. They are useful for preparing a wide variety of end products, including ethylene oxide, propylene oxide, ethylbenzene, acetone, phenol, polyethylene, polypropylene, other polymers, and other petrochemical products. Even though their prices have been fluctuated over time, their demands in the industry have still been continuously growing.

To serve the industrial needs, many methods have been used to produce olefins. However, it is typically more economically attractive to produce olefins from lower valued feedstock such as paraffin. A conventional method for converting parafins to olefins is thermal cracking. This is a highly energy intensive method and product selectivity is difficult to be adjusted and controlled. Catalytic cracking is a later developed method. With appropriate catalytic materials, generally zeolite-based materials, hydrocarbon cracking can occur at less severe operating condition.

Several improvements on catalytic cracking have been studied and disclosed. For example, U.S. Pat. No. 8,933,286 B2 disclosed a catalytic cracking process using a zeolite catalyst modified with nickel. The process can be operated at milder operating condition. However, significant amount of by-products including methane and C5+ hydrocarbons can be observed and there was no indication regarding stability of the catalyst.

U.S. Pat. No. 8,198,498 B2 disclosed a carbon nanotube catalyst coated with metal oxides for using in hydrocarbon cracking process. The process is still highly energy intensive because it has to be carried out at quite high temperatures, and preferably with addition of steam to the feed stream, in order to achieve improved yield of the desirable olefins product.

It is, therefore, an object of the present invention to provide a hydrocarbon conversion process overcoming drawbacks of the prior art. In particular, a process shall be provided allowing the conversion of a hydrocarbon feed comprising saturated hydrocarbon compounds to olefin products, i.e. less saturated hydrocarbon products. It is further object to provide a process allowing the above conversion at mild conditions, in particular at comparatively low temperatures. Furthermore, it is an object to provide a process allowing the conversion of olefins with high selectivity, i.e. by avoiding undesired by-products, such as methane or hydrocarbons having 5 or more carbon atoms.

SUMMARY OF INVENTION

The present invention provides as a solution of the problem a process for conversion of a hydrocarbon feed comprising saturated hydrocarbon compounds to olefin products comprising contacting a hydrocarbon feed stream with a catalyst in an oxidic form comprising metals M1, M2, M3 and M4, wherein:
  M1 is selected from Si, Al, Zr, and mixtures thereof;
  M2 is selected from Pt, Cr, and mixtures thereof;
  M3 is selected from W, Mo, Re, and mixtures thereof, and
  M4 is selected from Sn, K, Y, Yb and mixtures thereof,
  wherein
  mass fraction of M1 is in the range of 0.1 to 0.8;
  mass fraction of M2 is in the range of 0.001 to 0.2;
  mass fraction of M3 is in the range of 0.001 to 0.2;
  mass fraction of M4 is in the range of 0.0001 to 0.2; and
  mass fraction of oxygen is in the range of 0.1 to 0.8.

The inventive process uses the inventive catalyst for converting a hydrocarbon feed to olefin products with high selectivity and at a relatively mild condition.

DETAILED DESCRIPTION

In an embodiment, the hydrocarbon conversion process according to the present invention is a process employing a catalyst for hydrocarbon conversion, the catalyst being a multi-metal composition comprising
  M1 is selected from Si, Al, Zr, and mixtures thereof;
  M2 is selected from Pt, Cr, and mixtures thereof, preferably Pt;
  M3 is selected from W, Mo, Re, and mixtures thereof, preferably W;
  M4 is selected from Sn, K, Y, Yb and mixtures thereof; and
  oxygen;
  wherein
  mass fraction of M1 is in the range of 0.1 to 0.8, preferably 0.2 to 0.6;
  mass fraction of M2 is in the range of 0.001 to 0.2, preferably 0.0015 to 0.15, more preferably 0.005 to 0.1;
  mass fraction of M3 is in the range of 0.001 to 0.2, preferably 0.005 to 0.15, more preferably 0.01 to 0.1;
  mass fraction of M4 is in the range of 0.0001 to 0.2, preferably 0.00015 to 0.03, more preferably 0.005 to 0.02; and
  mass fraction of oxygen is in the range of 0.1 to 0.8, preferably 0.2 to 0.5.

In this regard, it may be provided that the term "mass fraction" in this regard refers to the total mass (weight) of the catalyst defined above.

In one embodiment, the catalyst has the formula M1M2M3M4O.

In another embodiment, the catalyst further comprises M5 (i.e. a catalyst of formula M1M2M3M4M5O), wherein M5 is selected from Mg, Ca, Mn, Fe, Co, Ni, Cu, and mixtures thereof preferably Mg, Ca, and mixture thereof, and
  mass fraction of M5 is in the range of 0.005 to 0.1, preferably 0.01 to 0.09.

Each of the above preferred embodiments related to a preferred metal or referring to specific amounts of the respective ingredient being comprised in the catalyst allows to achieve a better catalyst, i.e. a catalyst showing improved selectivity and being operable at lower temperatures. Each of the above preferred embodiments alone is suitable for improving the catalyst. However, combinations of one or more of the above preferred metals or preferred amounts thereof may synergistically improve the catalyst.

The catalyst according to the present invention can be prepared by mixing all precursors of the element M1 to M5 together followed by a suitable heat treatment in order to obtain the desired multi-metal composition. Element precursors are starting compounds containing the desired elements which can be converted to the desired form of elements, preferably oxides, in the final catalyst by a suitable heat treatment. For example, precursor to M1 to M5 may include oxides, halides, alkoxide, nitrates, carbonates, formate, oxalates, amine, or hydroxides of the elements.

Mixing of element precursors can occur in dry form or wet form. When they are mixed in dry form, the element precursors may conveniently be provided in powder form. Powder of the element precursors can be easily mixed by physical mixing in a blender. The element precursors' mixture is then subjected to a suitable heat treatment, preferably calcination, to obtain the final hydrocarbon conversion catalyst. When they are mixed in wet form, the element precursors may be provided in solution and/or suspension form. A mixture of the element precursors' solutions and/or suspensions is then dried to remove the solvents. Subsequently, the dried mixture is subjected to a suitable heat treatment, preferably calcination, to obtain the final catalyst. Alternatively, some of the element precursors are provided in dry form and some of the element precursors are provided in wet form. The dry and wet element precursors can be combined by conventional methods including impregnation, incipient wetness, ion-exchange, or other methods known in the art. The obtained mixture is then subjected to a suitable heat treatment, preferably calcination, to obtain the final catalyst. A suitable heat treatment involves a selected atmosphere and a selected temperature capable of removing and/or converting at least a part of the element precursors to the desired form of the corresponding elements in the final catalyst. Particularly preferred is the elements are in oxides form in the final catalyst. The selected atmosphere may include oxidizing atmosphere, reducing atmosphere, and inert atmosphere. In a preferred embodiment, the prepared catalyst powder is subjected to calcination in air at a temperature in the range of 300° C. to 800° C. for 1 to 24 hours, even more preferably 400° C. to 600° C. for 2 to 10 hours In another embodiment, preparation of the catalyst according to the present invention may further involve forming the catalyst powder into a shape suitable for a commercial reactor. Shapes suitable for a commercial reactor may include pellets, extrudates, spheres, and the like. Sufficient binder materials may be further added to the catalyst composition to facilitate forming of the catalyst. Providing the catalyst in a specific shape allows more easy use thereof.

In order to achieve olefins product, it is favorable that the hydrocarbon feed stream comprises a paraffinic hydrocarbon. In a preferred embodiment, the hydrocarbon feed stream comprises a paraffin having 2 to 5 carbon atoms. In a more specific embodiment, the hydrocarbon feed stream comprises a paraffin selected from ethane, propane, butane, pentane and mixtures thereof; preferably propane, butane, and a mixture thereof.

The hydrocarbon conversion process can be operated in a wide range of operating conditions. However, some specific ranges of operating conditions can result in high olefins production selectivity. In an embodiment, the process is carried out at a temperature in the range of 200° C. to 700° C., preferably 300° C. to 600° C., even more preferably 350° C. to 550° C. The catalyst used in the invention process allows to drive the inventive hydrocarbon conversion process at the before mentioned preferred temperatures which are comparably low with respect to the processes known in the art. In another embodiment, the process is carried out at a pressure in the range of 0.01 to 10 bar gauge, preferably 0.05 to 5 bar gauge. The contact time needed to obtain a desirable yield of olefins product depends upon several factors such operating temperature, operating pressure, and catalyst activity. In an embodiment, the process is carried out at a weight hourly space velocity (WHSV) in the range of 0.01 to 20 hr$^{-1}$, preferably 0.05 to 5 hr$^{-1}$. The process can be conducted in a batch manner or a continuous manner. For commercial scale, it is favorable that the process is continuously operated. Continuous operation can be performed with fixed bed, fluidized bed, or other techniques known in the art with fixed bed being typically preferred.

Prior to contacting with the hydrocarbon feed stream, the catalyst may optionally be pretreated. The pretreatment condition may include contacting the catalyst with an inert gas, an oxidizing gas, a reducing gas, a hydrocarbon, preferably a C2-C6 aliphatic hydrocarbon, and any mixture thereof. The pretreatment may be divided into several steps wherein each step may employ different conditions and atmospheres. It is generally preferred that the pretreatment is performed at a heated temperature, preferably 200° C. to 700° C., more preferably 300'C to 600'C, even more preferably 350° C. to 550° C.

After contacted with the hydrocarbon feed stream at the operating condition, some poisonous substances, heavy hydrocarbons, and coke may deposit on the surface of the catalyst. This normally affects activity of the catalyst to gradually drop over time. A suitable regeneration can be performed on the used catalyst to recover at least some of its activity. In an embodiment, the hydrocarbon conversion process comprises a regeneration step wherein the regeneration step includes contacting the hydrocarbon conversion catalyst with an oxidizing agent at a high temperature. The regeneration step should be carefully controlled to avoid overheating and destroying structure of the catalyst. In an embodiment, the regeneration step is carried out at a temperature in the range of 200° C. to 700° C., preferably 300° C. to 600° C. Other known regeneration techniques can be employed without limitation.

The hydrocarbon conversion process according to the present invention is capable of converting light paraffin feed with high selectivity to light olefin products, especially ethylene and propylene. Significantly low amount of less valued by-products such as methane and heavier hydrocarbons are produced.

Embodiments and advantages of the present invention are further illustrated by the following examples.

EXAMPLES

Example 1 (Comparative)

A zeolite catalyst containing 0.95 mass fraction of Si and 0.05 mass fraction of Al was contacted with propane at 475° C., 1 bar gauge, and WHSV of 0.12 h$^{-1}$. Results of this reaction at time on stream 3 hours and 8 hours are displayed in Table 1.

Example 2 (Comparative)

A catalyst containing 0.5 mass fraction of Al, 0.45 mass fraction of O, and 0.05 mass fraction of Pt was contacted with propane at 475° C., 1 bar gauge, and WHSV of 0.12 $h^{-1}$. Results of this reaction at time on stream 3 hours and 8 hours are displayed in Table 1.

Example 3 (Comparative)

A catalyst containing 0.245 mass fraction of Si, 0.215 mass fraction of Al, 0.045 mass fraction of W, 0.475 mass fraction of O, and 0.02 mass fraction of Pt was contacted with propane at 475° C., 1 bar gauge, and WHSV of 0.12 $h^{-1}$. Results of this reaction at time on stream 3 hours and 8 hours are displayed in Table 1.

Example 4 (Inventive)

A catalyst containing 0.26 mass fraction of Si, 0.21 mass fraction of Al, 0.045 mass fraction of W, 0.455 mass fraction of O, 0.02 mass fraction of Pt, and 0.01 mass fraction of K was contacted with propane at 475° C., 1 bar gauge, and WHSV of 0.12 $h^{-1}$. Results of this reaction at time on stream 3 hours and 8 hours are displayed in Table 1.

Example 5 (Inventive)

A catalyst containing 0.26 mass fraction of Si, 0.21 mass fraction of Al, 0.045 mass fraction of W, 0.455 mass fraction of O, 0.02 mass fraction of Pt, and 0.01 mass fraction of Sn was contacted with propane at 475° C., 1 bar gauge, and WHSV of 0.12 $h^{-1}$. Results of this reaction at time on stream 3 hours and 8 hours are displayed in Table 1.

Example 6 (Inventive)

A catalyst containing 0.306 mass fraction of Si, 0.012 mass fraction of Al, 0.031 mass fraction of Mg, 0.044 mass fraction of W, 0.387 mass fraction of O, 0.189 mass fraction of Zr, 0.02 mass fraction of Pt, and 0.011 mass fraction of Y was contacted with propane at 475° C., 1 bar gauge, and WHSV of 0.12 $h^{-1}$. Results of this reaction at time on stream 3 hours and 8 hours are displayed in Table 1.

Example 7 (Inventive)

A catalyst containing 0.248 mass fraction of Si, 0.213 mass fraction of Al, 0.031 mass fraction of Mg, 0.044 mass fraction of W, 0.433 mass fraction of O, 0.02 mass fraction of Pt, and 0.011 mass fraction of K was contacted with propane at 475° C., 1 bar gauge, and WHSV of 0.12 $h^{-1}$. Results of this reaction at time on stream 3 hours and 8 hours are displayed in Table 1.

TABLE 1

| | | Result | | | | | | | | | | | | | |
|---|---|---|---|---|---|---|---|---|---|---|---|---|---|---|---|
| | | | | Selectivity (wt %) | | | | | | | | | | | |
| | Catalyst (mass | Conversion (wt %) | | Total Olefins | | C2H4 | | C3H6 | | C4H8 | | CH4 | | C5+ | |
| Ex. | fraction) | 3 h | 8 h | 3 h | 8 h | 3 h | 8 h | 3 h | 8 h | 3 h | 8 h | 3 h | 8 h | 3 h | 8 h |
| 1* | 0.95 Si 0.05 Al* | 40.1 | 32.0 | 22.53 | 19.61 | 2.1 | 2.0 | 1.6 | 3.2 | 18.7 | 12.2 | 41.12 | 42.65 | 6.17 | 2.75 |
| 2* | 0.5 Al 0.45 O 0.05 Pt | 12.3 | 11.2 | 52.7 | 56.1 | 0.1 | 3.7 | 52.0 | 41.6 | 0.6 | 10.8 | 5.3 | 5.3 | 3.0 | 3.0 |
| 3* | 0.245 Si 0.215 Al 0.045 W 0.475 O 0.02 Pt | 14.0 | 10.9 | 72.8 | 82.1 | 1.3 | 1.9 | 61.1 | 70.5 | 10.4 | 9.7 | 7.4 | 6.0 | 1.5 | 1.1 |
| 4 | 0.26 Si 0.21 Al 0.045 W 0.455 O 0.02 Pt 0.01 K | 15.3 | 13.9 | 86.0 | 89.4 | 11.1 | 11.5 | 58.5 | 61.2 | 16.4 | 16.8 | 3.4 | 2.3 | 0.1 | 0.0 |
| 5 | 0.26 Si 0.21 Al 0.045 W 0.455 O 0.02 Pt 0.01 Sn | 16.9 | 14.3 | 87.6 | 92.9 | 11.1 | 20.3 | 59.4 | 55.3 | 17.0 | 17.3 | 2.4 | 1.4 | 0.1 | 0.0 |
| 6 | 0.306 Si 0.012 Al 0.031 Mg 0.044 W 0.387 O 0.189 Zr 0.02 Pt 0.011 Y | 18.5 | 16.9 | 86.4 | 92.4 | 14.2 | 19.1 | 55.5 | 50.0 | 16.7 | 23.2 | 1.1 | 1.1 | 0.1 | 0.1 |
| 7 | 0.248 Si 0.213 Al 0.031 Mg 0.044 W 0.433 O 0.02 Pt 0.011 K | 19.1 | 15.6 | 90.8 | 94.0 | 22.2 | 22.7 | 53.1 | 56.4 | 15.6 | 15.0 | 2.8 | 1.9 | 0.1 | 0.0 |

The selectivity of total olefins was calculated from selectivity of olefin products including ethylene, propylene, and butenes.

It can be seen that the processes using the inventive catalysts results in higher selectivity of total olefin products and lower production of methane and heavier hydrocarbons.

The features disclosed in the foregoing description and in the claims may, both separately or in any combination, be material for realizing the invention in diverse forms thereof.

The invention claimed is:

1. A process for conversion of a hydrocarbon feed comprising saturated hydrocarbon compounds to olefin products comprising contacting the hydrocarbon feed with a catalyst in an oxidic form comprising metals M1, M2, M3 and M4, wherein:
   M1 is selected from Si, Al, Zr, and mixtures thereof;
   M2 is selected from Pt, Cr, and mixtures thereof;
   M3 is selected from W, Mo, Re, and mixtures thereof; and
   M4 is selected from Sn, K, Y, Yb and mixtures thereof;
   wherein
   mass fraction of M1 is in the range of 0.1 to 0.8;
   mass fraction of M2 is in the range of 0.001 to 0.2;
   mass fraction of M3 is in the range of 0.001 to 0.2;
   mass fraction of M4 is in the range of 0.0001 to 0.2; and
   mass fraction of oxygen is in the range of 0.1 to 0.8,
   wherein the olefin products include ethylene, propylene, and butenes.

2. The process according to claim 1 wherein the process is carried out at a temperature in the range of 200° C. to 700° C.

3. The process according to claim 2 wherein the process is carried out at a temperature in the range of 300° C. to 600° C.

4. The process according to claim 1 wherein M2 is Pt.

5. The process according to claim 1 wherein M3 is W.

6. The process according to claim 1 wherein the mass fraction of M1 is in the range of 0.2 to 0.6.

7. The process according to claim 1 wherein the mass fraction of M2 is in the range of 0.0015 to 0.15.

8. The process according to claim 1 wherein the mass fraction of M3 is in the range of 0.005 to 0.15.

9. The process according to claim 1 wherein the mass fraction of M4 is in the range of 0.00015 to 0.03.

10. The process according to claim 1 wherein the mass fraction of oxygen is in the range of 0.2 to 0.5.

11. The process according to claim 1 wherein the catalyst further comprises M5 selected from Mg, Ca, Mn, Fe, Co, Ni, Cu, and mixtures thereof.

12. The process according to claim 11 wherein mass fraction of M5 is in the range of 0.005 to 0.1.

13. The process according to claim 12 wherein the mass fraction of M5 is in the range of 0.01 to 0.09.

14. The process according to claim 1 wherein the hydrocarbon feed comprises at least one paraffin having 2 to 5 carbon atoms.

15. The process according to claim 14 wherein the hydrocarbon feed comprises at least one paraffin selected from propane, butane, and a mixture thereof.

16. The process of claim 1, wherein the hydrocarbon feed comprises propane and the catalyst comprises the metals M1, M2, M3, and M4, wherein:
   M1 is a mixture of Si and Al or a mixture of Si, Al, and Zr;
   M2 is Pt;
   M3 is W; and
   M4 is selected from Sn, K, Y, Yb, and mixtures thereof.

17. The process of claim 1, wherein the contacting of the hydrocarbon feed with the catalyst occurs in the absence of an oxidizing agent.

* * * * *